United States Patent [19]

Isakson et al.

[11] 4,207,565

[45] Jun. 10, 1980

[54] PISTON OVERTRAVEL INDICATOR

[75] Inventors: Larry E. Isakson; Dennis M. Stanuszek; William E. Fritsche, all of Owosso, Mich.

[73] Assignee: Midland-Ross Corporation, Cleveland, Ohio

[21] Appl. No.: 914,500

[22] Filed: Jun. 12, 1978

[51] Int. Cl.[2] .......................... G08B 21/00; B60Q 1/26; H01H 35/38

[52] U.S. Cl. ...................................... 340/626; 92/5 R; 33/DIG. 15; 116/272; 116/280; 200/82 D; 340/52 C; 137/806

[58] Field of Search ............... 340/548, 605, 626, 611, 340/614, 52 C, 617; 200/82 R, 82 C, 252-261, 82 D; 92/5 R; 137/806; 73/308, 313, 319, 321, 322; 33/DIG. 15; 116/272, 280

[56] References Cited

U.S. PATENT DOCUMENTS

| | | | |
|---|---|---|---|
| 3,087,038 | 4/1963 | Bethke | 200/252 X |
| 3,947,648 | 3/1976 | Muterel | 340/52 C X |
| 3,997,887 | 12/1976 | Poynter | 340/626 X |

*Primary Examiner*—John W. Caldwell, Sr.
*Assistant Examiner*—Daniel Myer
*Attorney, Agent, or Firm*—H. Duane Switzer

[57] ABSTRACT

An overtravel indicator for a piston received in a cylinder having an end wall toward which the piston moves includes an elongated indicator rod slidably mounted through a dielectric bushing in the end wall. A conductive garter spring is compressed between the indicator rod and a groove in the cylinder end wall. An electric circuit including an electrically operated indicator is connected for completion through the indicator rod, end wall and garter spring. In an inward armed position of the indicator rod, dielectric material carried by the rod is interposed between the rod and garter spring for opening the electric circuit. In an outward operated position of the rod, a conductive surface on the rod engages the garter spring to complete the circuit and operate the indicator.

10 Claims, 3 Drawing Figures

PISTON OVERTRAVEL INDICATOR

BACKGROUND OF THE INVENTION

This application pertains to the art of indicators and, more particularly, to indicators for indicating overtravel of a piston in a cylinder. The invention is particularly applicable for use with pressure converters and will be particularly described with reference thereto. However, it will be appreciated that the invention has broader aspects and may be used for indicating overtravel of other devices.

Piston overtravel indicators of a known type include that disclosed in U.S. Pat. No. 3,997,887 issued Dec. 14, 1976, to Poynter. In an arrangement of this type, an elongated indicator rod extends through a hole in a cylinder end wall toward which a piston moves. The indicator rod has a normal armed position extending inwardly through the cylinder end wall and an operated position extending outwardly thereof. In the event of overtravel of the piston toward the cylinder end wall, the piston engages the indicator rod for extending same to its operated position. This causes the rod to operate a switch assembly which is separately mounted to the end wall. The use of a completely separate switch assembly is very expensive.

In another prior arrangement, an electrical circuit is connected for completion between the cylinder piston and the indicator rod. Therefore, overtravel of the piston for engaging the indicator rod completes a circuit to operate a visual or audible indicator. However, return of the piston to the overtravel position again opens the electric circuit. It would be desirable to have an indicator of the type described wherein the electric circuit would remain closed once the piston overtraveled until the defect causing the overtravel was corrected and the indicator rod would then be manually moved back to its armed position.

SUMMARY OF THE INVENTION

A piston overtravel indicator of the type described has electrically conductive yieldable means mounted to the cylinder end wall in resilient gripping relationship to the indicator rod. An electric circuit having an electrically operated indicator is connected for completion through the electrically conductive yieldable means and the indicator rod. Upon piston overtravel, the indicator rod is extended outwardly to an operated position for completing the electric circuit through the indicator rod, yieldable means and cylinder end wall. The yieldable means resiliently holds the indicator rod in an extended operated position until it is manually pushed back to its armed position even though the piston may return from its overtravel position.

In a preferred arrangement, the yieldable means comprises a metal garter spring compressed between the indicator rod and a groove in the cylinder end wall.

The indicator rod is slidably mounted through a dielectric bushing mounted in a bore in the end wall. The bushing is coaxial with a hole through the end wall and a circumferential groove is defined between the cylinder hole and the bottom of the dielectric bushing.

The outer end portion of the indicator rod which extends through the end wall hole and past the yieldable means is of a substantially smaller diameter than the remainder of the rod. A circumferential cam surface is defined between the smaller diameter outer rod portion and the remainder of the rod for camming the yieldable means generally radially outwardly and further compressing when the rod moves to its operated position. Therefore, the yieldable means more firmly grips the rod to better hold same in its operated position and to provide better electrical conductivity.

It is a principal object of the present invention to provide an improved piston overtravel indicator.

It is also an object of the invention to provide an improved piston overtravel indicator which does not require a separate switch assembly.

It is an additional object of the invention to provide an improved piston overtravel indicator which maintains an electrical circuit closed until the indicator is manually reset.

DESCRIPTION OF PREFERRED EMBODIMENTS

Figure 1:
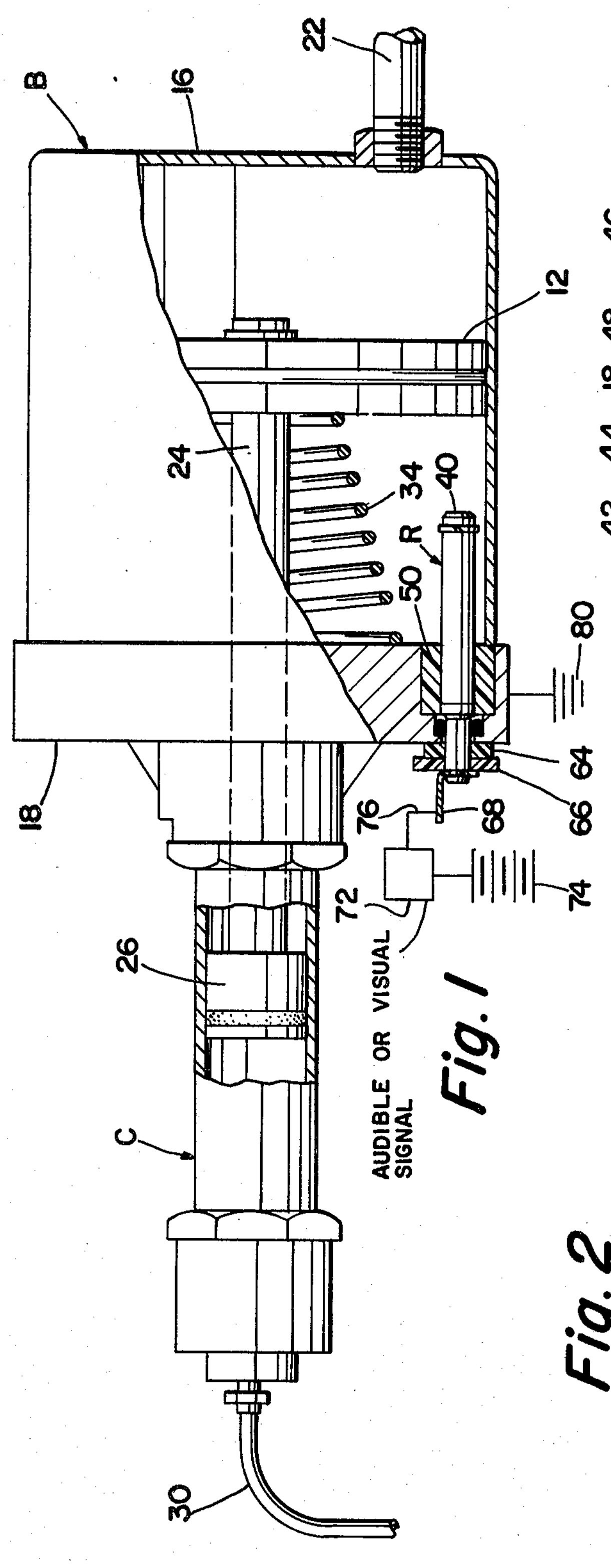
FIG. 1 is a side elevational view of a pressure converter having the improved indicator of the present application incorporated therein, and with portions cut away and in section for clarity of illustration.

With reference to the drawing, FIG. 1 shows a pressure converter for converting air pressure to hydraulic pressure. An air cylinder B receives an air piston 12 which moves from a normal rest position adjacent one cylinder end wall 16 to working positions toward other cylinder end wall 18. Air piston 12 is shown in the vicinity of a working position after movement from its rest position adjacent cylinder end wall 16 by supplying air pressure to cylinder B through conduit 22. The force of air pressure acting on piston 12 is transmitted by rod 24 to hydraulic piston 26 in hydraulic cylinder C. Hydraulic pressure is transmitted from hydraulic cylinder C through conduit 30 to brakes or other hydraulically operated devices. Air piston 12 is normally biased back to its rest position adjacent one cylinder end wall 16 by coil spring 34. In the event of a failure in the hydraulic devices operated by hydraulic pressure supplied through conduit 30, air piston 12 will overtravel beyond its normal working positions and move further toward other cylinder end wall 18. When overtravel occurs, air piston 12 will engage inner end 40 of an indicator rod R for operating an indicating device to warn the equipment operator that a failure has occurred or that an adjustment is necessary.

Cylinder end wall 18 has a hole 42 therethrough extending parallel to the direction of movement of air piston 12. A first bore 44 extends inwardly from inner surface 46 of cylinder end wall 18 coincidentally with hole 42. A second larger bore 48 extends inwardly from inner surface 46 of cylinder end wall 18 coincidentally with first bore 44 and hole 42.

A bushing 50 of plastic or other suitable dielectric material is press fit in second bore 48 and has a bushing hole 52 of the same diameter as end wall hole 42 and coincidental therewith. With bushing 50 in position in second bore 48, first bore 44 actually defines an end wall circumferential groove located between hole 42 and the inner end of bushing 50.

Conductive yieldable means in the form of a garter spring 56 is received in end wall circumferential groove 44. Metal indicator rod R is shown in an inwardly extended armed position and is movable to the left in the figures to an outwardly extended operated position. In its inwardly extended armed position, metal indicator rod R has a reduced diameter outer end portion 58 which extends past conductive yieldable means 56 and extends through hole 42. The remaining portion of rod R is slidably guided within bushing hole 52. Outer rod end portion 58 is covered with plastic or other dielectric material 60 having a sloping cam surface 62 which slopes outwardly in a direction toward inner rod end 40.

A disc of relatively soft sponge-like plastic or the like 64 is positioned around outer rod end portion 58 for sealing end wall hole 42 against contamination by dirt. A more rigid plastic washer 66 is positioned around rod outer end portion 58 for bearing against gasket member 64 to hold same securely against the outer surface of cylinder end wall 18. A metal electrical connector 68 is swaged or otherwise suitably secured to the outer end portion 58 of rod R. A snap ring 70 is received in a suitable circumferential groove in rod R adjacent inner rod end 40 to prevent complete outward displacement of rod R through end wall 18.

Figure 2:
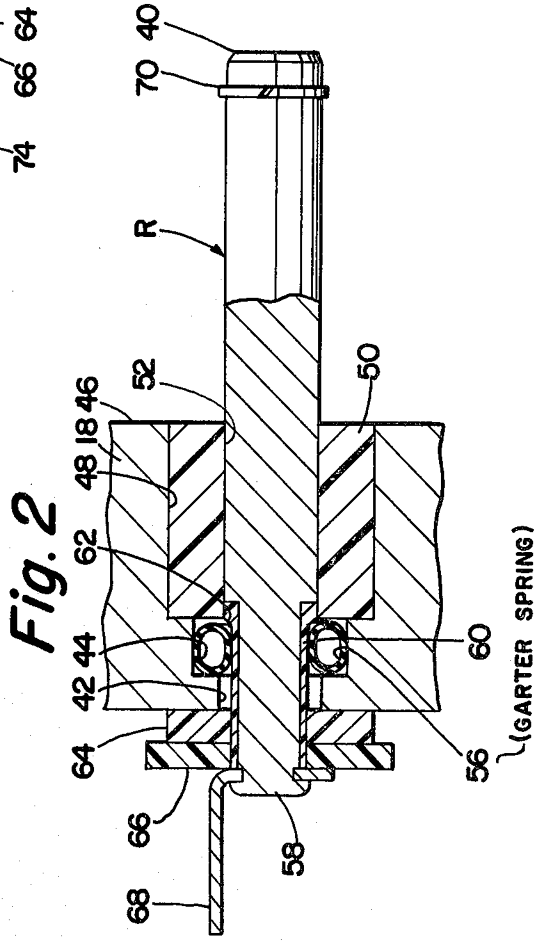
FIG. 2 is a cross-sectional side elevational view of an indicator constructed in accordance with the present application.

An electrical circuit including an electrically operated audible or visual signal 72, such as a buzzer or light, is connected for completion through rod R and yieldable means 56. A battery 74 is connected to indicator device 72 which in turn is connected as at 76 with electrical connector 68 on rod R. Metal cylinder end wall 18 is grounded as indicated at 80. In the armed position of rod R shown in FIG. 2, dielectric material 60 is interposed between rod R and conductive yieldable means 56. Therefore, the electrical circuit is open. When air piston 12 overtravels toward cylinder end wall 18, piston 12 engages rod end 40 to extend rod R outwardly. Cam surface 62 causes radial outward movement of yieldable means 56 to allow outward extension of rod R. The conductive outer surface portion of rod R will then engage conductive yieldable means 56 to complete the electrical circuit through end wall 18, conductive yieldable means 56 and rod R for operating indicator device 72. Yieldable means 56 holds rod R in its extended position even though air piston 12 moves out of engagement with rod R. Rod R can be reset to its armed position by a mechanic pushing rod R back in through cylinder end wall 18. Radial squeezing of yieldable means 56 between the bottom of end wall groove 44 and the conductive outer surface of rod R also insures good electrical contact for completing the electric circuit.

Figure 3:
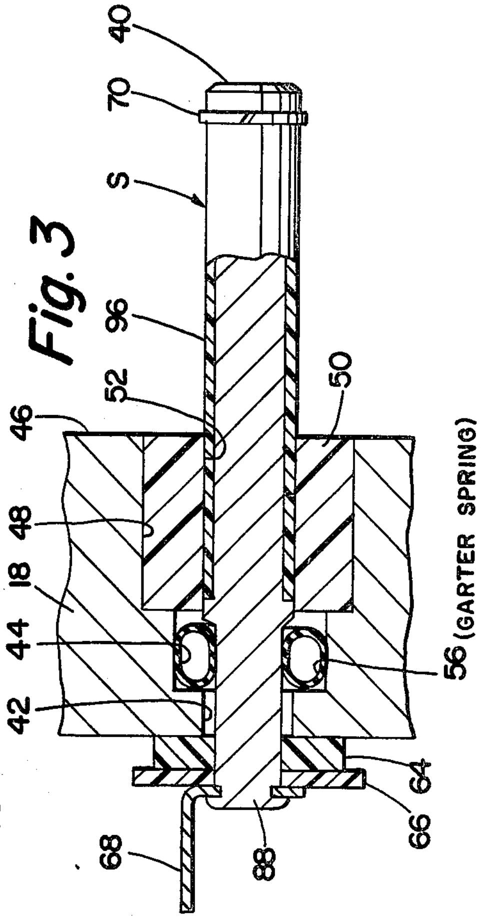
FIG. 3 is a view similar to FIG. 2 and showing another embodiment.

In the arrangement of FIG. 3, an indicator rod S differs from indicator rod R by having an outer rod end portion 88 which is not covered by dielectric material. Therefore, in the inwardly extending armed position of rod S, an electrical circuit is completed through end wall 18, yieldable means 56 and outer rod end portion 88. The remaining portion of rod S has dielectric material 96 thereon. Therefore, movement of rod S outwardly to its extended operated position will cause dielectric material 96 to be interposed between the rod S and conductive yieldable means 56 for opening the electric circuit.

In the arrangements shown and described, the mounting means for slidably mounting rod R or S through cylinder end wall 18 includes a yieldable conductive means 56 in the form of a garter spring through which the electrical circuit is completed. The indicator rod is movable between armed and operated positions, and acts to complete an electric circuit in one of such positions and to open the electric circuit in the other of such positions. The yieldable means defined by garter spring 56 performs the multiple functions of releasably retaining the indicator rod in its inwardly extending armed position, releasably retaining the rod in its extended operated position until manually reset, and resiliently grips around the periphery of the rod to insure good electrical contact.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. An overtravel indicator for a piston received in a cylinder having an end wall toward which the piston moves, mounting means for slidably mounting an elongated indicator rod through said end wall, said rod having an armed position extending inwardly of said cylinder through said end wall and an operated position extending outwardly of the cylinder through said end wall, said mounting means including electrically conductive yieldable abutment means cooperating with stop means on said rod for releasably retaining said rod in said armed position, an electrically operated indicator device positioned in an electrical circuit, said rod and said abutment means being connected in series in said circuit for flow of electrical current through said rod and abutment means to complete said circuit when said rod and abutment means are in electrical conductive engagement with one another, said rod having a dielectric outer surface portion engaging said abutment means in one of said positions of said rod for opening said circuit, and said rod having an electrically conductive outer surface portion engaging said abutment means in the other position of said rod for closing said circuit to energize said indicator device.

2. The indicator of claim 1 wherein said mounting means includes a bushing of dielectric material slidably receiving said rod.

3. The indicator of claim 2 wherein said end wall has a bore therein and said abutment means comprises a garter spring surrounding said rod and compressed between said rod and said bore, and said stop means comprising a circumferential cam surface on said rod.

4. The indicator of claim 1 wherein said rod has said dielectric outer surface portion engaging said abutment means in said armed position of said rod.

5. An overtravel indicator for a piston received in a cylinder having an electrically conductive end wall toward which the piston moves, a hole through said end wall, an enlarged bore in said end wall coaxial with said hole, a dielectric bushing positioned in said bore, a first enlarged bore in said end wall coaxial with said hole and having a diameter larger than said hole, a second enlarged bore in said end wall coaxial with said first bore and having a diameter larger than said first bore and a depth less than the depth of said first bore, a dielectric bushing positioned in said second bore, said first bore having a bottom end and a peripheral wall and said bushing having an inner end, said first bore between said bottom end thereof and said inner end of said bushing defining a circumferential groove having a groove bottom wall defined by said peripheral wall of said first bore, an elongated rod slidably extending through said bushing for movement between an armed position projecting inwardly of said cylinder and an operated position projecting outwardly of said cylinder, electrically conductive yieldable means positioned in said groove in resilient engagement with said groove bottom wall and with said rod, and electric circuit including an electrically operated indicator, said rod and said yieldable means being connected in series in said circuit for flow of electrical current through said rod and yieldable means to complete said circuit when said rod and yieldable means are in electrical conductive engagement with one another, said rod having a dielectric surface portion engaging said yieldable means in one of said rod positions for opening said circuit and having a conductive surface portion engaging said yieldable means in the other position of said rod for completing said circuit.

6. The indicator of claim 5 wherein said yieldable means comprises a metal garter spring.

7. The indicator of claim 5 wherein said end wall has an inner surface facing inwardly of said cylinder and said bores extend into said end wall from said inner surface thereof.

8. The indicator of claim 7 wherein said rod has an outer rod end portion engaging said yieldable means and extending through said end wall hole in said armed position of said rod, said rod outer end portion being of substantially smaller diameter than the remainder of said rod and having a diameter substantially smaller than the diameter of said end wall hole.

9. The indicator of claim 8 wherein said rod outer end portion includes said rod dielectric surface portion so that said circuit is open in said armed position of said rod and is closed in said operated position thereof.

10. The indicator of claim 9 wherein said yieldable means comprises a metal garter spring which is under compression between said groove bottom wall and said rod outer end portion, said spring having a substantially circular cross-sectional shape when in an unstressed relaxed condition and having a substantially oval cross-sectional shape when under compression between said groove bottom wall and said rod outer end portion.

* * * * *